United States Patent [19]

Burke

[11] 4,066,471

[45] Jan. 3, 1978

[54] CONSTRUCTIONAL CEMENT

[75] Inventor: Edward Burke, Rochester, England

[73] Assignee: The Associated Portland Cement Manufacturers Limited, London, England

[21] Appl. No.: 632,796

[22] Filed: Nov. 17, 1975

[30] Foreign Application Priority Data

Nov. 26, 1974 United Kingdom ............... 51142/74
June 24, 1974 United Kingdom ............... 26715/75

[51] Int. Cl.$^2$ .............................................. C04B 7/32
[52] U.S. Cl. ...................................... 106/104; 106/85
[58] Field of Search ................................... 106/85, 104

[56] References Cited

U.S. PATENT DOCUMENTS

| | | | |
|---|---|---|---|
| 1,908,636 | 5/1933 | Langenberg et al. | 106/85 X |
| 2,450,952 | 10/1948 | Greger | 106/85 X |
| 2,868,294 | 1/1959 | Beale et al. | 106/85 |
| 3,167,439 | 1/1965 | Vukasovich | 106/85 |
| 3,202,520 | 8/1965 | Enoch | 106/85 |
| 3,511,674 | 5/1970 | Harris et al. | 106/85 |
| 3,730,744 | 5/1973 | Yavorsky | 106/85 X |
| 3,804,651 | 4/1974 | Semler | 106/85 |

Primary Examiner—Winston A. Douglas
Assistant Examiner—John F. Niebling
Attorney, Agent, or Firm—Diller, Brown, Ramik & Wight

[57] ABSTRACT

A constructional cement is produced by adding a solution of orthophosphoric acid to a particulate composition comprising at least one of a selection of combinations of oxides, which may be artificially prepared or natural.

9 Claims, No Drawings

CONSTRUCTIONAL CEMENT

The present invention relates to constructional cements and more particularly to a composition to fulfil the same role as Portland cement or high alumina cement, especially in applications where these two latter cements are not suitable.

Portland and high alumina cements, by virtue of their compositions, depend for their setting and hardening upon the formation of calcium hydroxide and hydrated silicates and aluminates in the case of Portland cement, and hydrated aluminates in the case of high alumina cement. A characteristic of both these cements is that the set products are more or less alkaline, i.e., the pH is above 7.

As is well known, these products are not completely resistant to attack by many sulphates, especially in high concentrations, or by certain salts of bases, such as magnesia (e.g., magnesium sulphate and magnesium chloride) in the case of Portland cement and sodium in the case of high alumina cement, which latter is also subject to deterioration in time at both normal and elevated temperatures. The hydrated products of both these cements are slightly soluble in water, particularly in water of low hardness value. Neither of these cements is resistant to solutions of mineral or organic acids in practically any significant concentration due to the alkaline nature of the hydrated cement products. It has been claimed that high alumina cement is resistant to acid solutions of pH 4 or greater. This degree of acidity is, however, very low.

Both Portland and high alumina cements are attacked by sugar solutions.

Because of the alkaline nature of these cements when mixed with water they are not permanently compatible with glass fibre or silica fibre because they attack these materials chemically especially at the surface which contributes most of their strength. Recently a special glass with a higher resistance to alkaline attack has been developed by the former Building Research Station but it is significantly more expensive than the usual fibre glass.

The very high strength silica fibre cannot be used with these cements. The result is that this form of reinforcement is mostly confined to the use of glass fibre with plastics materials such as epoxy and polystyrene resins, which are not fireproof.

The present invention overcomes these disadvantages by relying on a completely different chemical reaction in the setting cement. It relies on the reaction of a selected natural or artificially prepared chemical combination of mineral oxides with a solution of orthophosphoric acid, to form metal phosphates which set to a hard mass.

According to the present invention a cement is produced by adding a solution of orthophosphoric acid to a composition comprising at least one particulate chemical combination of oxides selected from anorthite ($CaO.Al_2O_3.2SiO_2$), monocalcium ferrite ($CaO.Fe_2O_3$), anorthite with iron oxide, monocalcium ferrite with iron oxide, magnesium orthosilicate ($2MgO.SiO_2$), ferrous orthosilicate ($2FeO.SiO_2$), calcium magnesium orthosilicate ($CaO.MgO.SiO_2$), calcium magnesium metasilicate ($CaO.MgO.2SiO_2$), calcium ferrous metasilicate ($CaO.FeO.2SiO_2$), solid solutions of said metasilicates with up to 10 weight percent monocalcium silicate ($CaO.SiO_2$), magnetite ($FeO.Fe_2O_3$), basic and ultrabasic rock minerals, and their artificially produced equivalents, containing an effective proportion as hereinafter defined of one or more said combinations of oxides.

The invention further provides a concrete or mortar or other composite product produced by mixing said combination of oxides with the orthophosphoric acid solution and an inert aggregate or a fibre reinforcement.

An "effective proportion" of a combination of oxides means a proportion of the active substance sufficient to cause setting to a hard mass on reaction with the orthophosphoric acid solution, and is readily found by experiment. In general it will be found to be at least 20 percent by weight but larger amounts may be required, for instance in a solid solution of anorthite and albite when the albite content exceeds about 10 percent.

The composition of the orthophosphoric acid solution should preferably be within the following range:

| orthophosphoric acid | 35 percent to 75 percent by weight |
|---|---|
| zinc orthophosphate | 0 percent to 15 percent by weight |
| aluminium othophosphate | 0 percent to 20 percent by weight |
| water made up to | 100 percent. |

In all the tests and Examples referred to herein, a phosphoric acid solution was used which has the following composition:

| orthophosphoric acid | 38 percent by weight |
|---|---|
| zinc orthophosphate | 14 percent by weight |
| water to | 100 percent. |

The said compositions comprising particulate combinations of oxides to be used according to the invention include those which are artificially prepared from raw materials and those which occur naturally. In the former case the composition of oxides may be obtained by sintering and subsequently grinding an intimate mixture of the minerals containing the constituent oxides or of compounds which form such oxides under the sintering conditions in appropriate relative proportions, whereas in the latter case the composition may be obtained by grinding a naturally occurring mineral rock containing said combination.

More specifically the cementitious composition is produced by calcining a mixture which contains or forms: $CaO$, $SiO_2$ and $Al_2O_3$ for anorthite, possibly with $Fe_2O_3$; $CaO$ and $Fe_2O_3$ for monocalcium ferrite; $CaO$ and $SiO_2$ for monocalcium silicate; $MgO$ and $SiO_2$ for magnesium orthosilicate; $CaO$, $MgO$ and $SiO_2$ for calcium magnesium metasilicate; $CaO$, $SiO_2$ and $Fe_2O_3$ or $FeO.Fe_2O_3$ fired in a reducing atmosphere for calcium ferrous metasilicate; these oxides being present mostly in compounds or being formed under the reaction conditions, in the proportions required.

Material contained or formed in said mixtures, extraneous to the requirements for producing the said combinations of oxides, and inactive in the formation of a cement according to the invention, are referred to herein simply as inactive, or inert, materials.

Suitable raw materials for the artificially prepared combinations of oxides include clays, marls or clay-like materials or materials derived therefrom, e.g., coal ash or pulverised clinker, examples being London clay, Kimmeridge clay, Oxford clay, china clay, shales, slates, and so forth. Normally these by themselves may not be of suitable composition and require the addition of alumina, calcium carbonate, limestone, magnetite, iron oxide, magnesite, magnesium oxide, magnesium carbonate, silica sand or even other clays or materials containing substantial amounts of one or other of these substances.

For constructional use it is of advantage to use compositions providing a significant amount of iron oxide as the resulting cements develop greater strength. When naturally occurring ferruginous clays, such as London clay, are used the cost of the raw materials will be less. Cements low in iron oxide, based on china clay, are useful if a white, light coloured or refractory cement is desired.

The raw materials are mixed together and finely ground, preferably wet, in ball or tube mills. It is of advantage to grind the raw materials to the finest degree that is economically advisable. If they are sufficiently soft they may be ground in wash mills or tumbling drums and, if necessary, ground further in ball or tube mills. They are calcined preferably in rotary kilns such as those used in Portland cement manufacture or other convenient furnaces according to circumstances. Such convenient furnaces may be kilns of the type used for firing building or refractory bricks which can be very economical especially if certain fuel-containing clays, such as Oxford clay, are used.

The optimum temperature of calcination for the artificially prepared cements is that which produces substantially complete chemical combination as determined by known chemical methods and which, for a given fineness of grinding of the cement, gives the highest strength in the final concrete. The temperature of calcination should be within the sintering range and will depend upon the composition and is determined by trial. For instance, with London clay, bauxite and chalk the calcination temperature may be as low as 1100° C, whereas with china clay and chalk it may be as high as 1500° C. Temperatures of firing thus lie generally between 1100° C and 1500° C but are not contravened by firing at somewhat higher temperatures depending upon the raw materials used.

Although the firing would normally be carried out in an oxidising atmosphere it is of no disadvantage to fire in a reducing atmosphere. In the application of the invention to monocalcium ferrite or anorthite or a mixture of these two, reaction with the orthophosphoric acid forms calcium phosphate and aluminium phosphate and, if iron oxide is present in the raw materials, ferric or ferrous phosphates, which set to a hard mass. If the calcination temperature is above 1216° C some or all of the monocalcium ferrite is decomposed and some ferric oxide with possibly some ferrous oxide is formed. If the calcination takes place in a reducing atmosphere ferrous oxide is formed and at higher proportions of iron oxide, e.g., above an equivalent of about 15 percent $Fe_2O_3$, ferrous oxide will be formed even in an oxidising atmosphere. Ferrous oxide reacts with phosphoric acid to form ferrous phosphate which contributes to the strength of the product. In these cements the ferrous oxide, when present, usually occurs with ferric oxide as magnetite. Magnetite, whether artificial or natural, when ground, reacts with orthophosphoric acid solutions to give a cement which sets and hardens giving a high strength. However, unless ground very coarsely it is quick or flash setting.

In relation to the calcination, it should be understood that sintering which generally occurs involves the production of a certain amount of melted material but the mass is not fluid at the maximum temperature although it may be in a plastic state which helps in the formation of nodules if the heating is in a rotary kiln.

Compositions intended for making anorthite but containing much excess silica, e.g., above about 10 percent, are usually deleteriously affected by melting and especially quenching, which latter produces a glass containing no anorthite, and during reaction with orthophosphoric acid excessive silica is liberated in a gelatinous condition which weakens the eventual concrete. An example is a cement having the composition: $SiO_2$ 52.3 percent; $Al_2O_3$ 30.1 percent; $Fe_2O_3$ 0.7 percent; CaO 16.8 percent which had been melted and quenched in water; it was a glass containing no anorthite. This gave a cement, which, when mixed neat with the phosphoric acid solution, set slowly and eventually hardened to a moderate degree. When made into a concrete it still had no significant strength at 8 months. The same composition when prepared by sintering gave a concrete with a normal setting time and which hardened satisfactorily giving in the 1-inch concrete cube test a strength of 6500 p.s.i at one month. This cement contained 82 percent anorthite, 16.9 percent excess silica and 1.1 percent minor oxides. When sintered and not quenched, less silica is liberated in a gelatinous condition. The compositions may be melted but must then be cooled in such a way as to avoid significant amounts of glass formation, i.e., they must be cooled sufficiently slowly which may take a very long time. The preferred method is sintering.

The calcination temperatures can be reduced significantly by the use of fluxes. If the iron oxide content exceeds 10 percent it is preferable, to avoid dissociation of monocalcium ferrite, that the firing temperature does not exceed 1200° C and the addition of a flux may be advisable if good combination is not attained. Provided economic and atmospheric pollution factors permit, the use of fluxes is of considerable advantage. Some raw materials, such as ordinary clays (London clay is an example), already contain fluxes in the form of alkalis but can be improved by the addition of further fluxes, possibly of a different type.

Fluxes that are of value are the alkalis, fluorides such as fluorspar (or calcium fluoride) and natural or artificial cryolite, and sodium or potassium fluoride.

Alkali fluxes should be limited in use as they may lead to soluble compounds on reaction with phosphoric acid. Amounts up to 5 percent $Na_2O$ plus $K_2O$ are safe. If more flux is desired it is better to introduce fluorspar or cryolite.

Cryolite is the most powerful of all the fluxes and if economic and pollution factors permit it is the one to choose but it contains an alkali (sodium) and, therefore, should be used with care. Fluorspar is free from this disadvantage, is cheaper but is less powerful. All the mixtures considered in this application are improved in one way or another by the careful addition of fluxes. This is particularly the case with the low iron oxide or iron free mixtures. These mixtures would be used for making a white and/or refractory cement but fluxes may be contra-indicated here as they may spoil the colour and will reduce the refractory property.

The setting time and rate of hardening of the cement is very flexible and is governed largely by its composition, fineness and the composition of the solution of phosphoric acid. These factors are decided by trial according to the properties required. The setting time may thus be adjusted by employing at least two said combinations of oxides having different individual cementsetting rates. Alternatively or in addition, the combination of oxides may be augmented by a compound having a retarding effect on the setting of the cement. Such a compound may be added in the artificial preparation of a combination, or may be present in the natural state, in either event as a chemically separate ingredient or combined with the other oxides.

For instance $2MgO.SiO_2$ is very slow setting and is speeded up by fine grinding. $2FeO.SiO_2$ is very quick setting and is retarded by firing a composition to give a solid solution with $2MgO.SiO_2$ and further control can be by means of the fineness of grinding. $2MgO.SiO_2$ may be speeded up in setting time by solid solution with $2FeO.SiO_2$. $CaO.MgO.2SiO_2$ and $CaO.FeO.2SiO_2$ are slow setting and are speeded up by firing a composition to give a solid solution with $CaO.SiO_2$. Setting time is controlled to some extent by the amount of water in the orthophosphoric acid solution, and some degree of increase of setting time is brought about by increasing the concentration of orthophosphoric acid. Temperature also has an effect; low temperatures increase the setting time, higher temperatures decrease it.

For the purposes of this invention the fineness of the cements is characterised by its characteristic particle size (C.P.S). The characteristic particle size is the particle size below which there is 50 percent by weight of the cement and is determined by the well-known Andreasen Sedimentation Method (British Standard 3406; Part 3: 1963, "Methods for the Determination of Particle Size of Powders. Liquid Sedimentation Methods".).

Magnesium orthosilicate is ground, preferably wet, at least down to a C.P.S of 10 microns. Ferrous orthosilicate is very quick setting by itself and would normally be produced in solid solution with magnesium orthosilicate which slows the setting time. By itself the C.P.S. would need to be 80 to 90 microns. The solid solutions would be ground to between this and 5 to 10 microns according as the composition passes from pure ferrous orthosilicate to pure magnesium orthosilicate. Calcium magnesium metasilicate is slow setting and would need to be ground to a C.P.S. of about 5 microns, but when combined with up to 10 percent calcium monosilicate in solid solution the grinding does not need to be so fine and may be about 10 to 20 microns C.P.S. The same applies to calcium ferrous metasilicate. Magnetite would need to be ground coarsely for use by itself; the C.P.S. would need to be not less than 25 microns but when diluted with inert finely ground material it may be ground more finely.

Anorthite by itself gives a cement with an extremely quick setting rate unless very coarsely ground. Normally it is necessary to moderate its action. It was found that incorporating an excess of silica in the raw mix produces a retardation of the setting time. This occurs through solid solution of some of the excess silica in the anorthite. An excess of alumina enhances the retardation by excess silica but excess alumina by itself is a poor retarder.

In the research work done by Rankin, Wright and others in the United States of America, in investigations of the Ternary System $CaO$ - $Al_2O_3$ - $SiO_2$ no solid solutions were found between anorthite ($CaO.Al_2O_3.2SiO_2$) and silica or alumina. This is because of the way the experiments were made. The samples were first melted and then cooled to various temperatures and quenched, or were melted and then very slowly cooled to obtain equilibrium. If the compositions are not melted but sintered a different state of affairs is obtained and solid solutions of silica, or silica and alumina, with anorthite are obtained. The Applicant has shown this by optical measurements in microscopical investigations. The presence of anorthite in the sintered specimens has been proved by microscopical methods and by X-ray diffraction analysis. X-ray diffraction shows that in melted and quenched samples (glasses) anorthite is absent.

Merely mixing finely ground silica and/or alumina with anorthite does not increase the setting time beyond the small amount caused by increasing the liquid-/anorthite ratio due to dilution of the anorthite with the silica. The mixture remains very quick setting as before.

A series of four cements was made to demonstrate the effect of solid solution.

Cement A

This cement consisted substantially of anorthite in the crystalline state and was made by sintering a mixture of 71.8 percent china clay, 3.1 percent alumina and 25.1 percent calcium carbonate at an average temperature of 1460° C for 10 minutes giving a thoroughly sintered and combined product. (The melting temperature of anorthite is 1553° C). It was confirmed by microscopical examination that the product consisted of anorthite crystals between 1 and 5 microns equivalent diameter and proved to be anorthite by X-ray diffraction analysis.

The product was ground to a C.P.S. of 11.9 microns. When mixed with the phosphoric acid solution it set instantaneously, with generation of heat and was quite unworkable.

Cements B to E

This was a series of four cements constituted to consist of anorthite and gradually increased amounts of excess silica. The mixes were sintered with the excess silica in them i.e., the excess silica was not mixed with the cement.

The results were as follows:

| Cement | Percent excess silica | Relative setting time. mins |
|--------|----------------------|----------------------------|
| B | 5 | 12 |
| C | 10 | 15 |
| D | 15 | 22 |
| E | 20 | 42 |

When pure anorthite cement is merely mixed with finely ground silica the mixture behaves quite differently from the above cements B to E. For instance, a mixture of 40 percent pure anorthite and 60 percent finely ground quartz (C.P.S. 6.8 microns) remained 'flash' setting with the phosphoric acid solution and could not be worked. The same was the case with other orthophosphoric acid mixtures within the range referred to.

The addition of titanium oxide to the raw mix retards the setting time of anorthite in a manner similar to silica as might be expected but is less preferable on economic grounds. The addition of bone ash (or calcium phosphate) to the raw mix has only a slight retarding action.

It may be seen, therefore, that according to the composition the cement may need to be ground coarsely or finely to give convenient setting times.

Setting time can also be controlled by adjusting the orthophosphoric acid content, e.g., above 50 percent orthophosphoric acid in the solution the setting time increases with acid concentration, but below this value the effect varies with the composition of the cement. Zinc and aluminium phosphates increase the setting time.

As indicated above, some of the combinations of oxides to be used in the invention occur naturally or are contained in natural rocks, which may be ground to form constructional cements by reaction with the orthophosphoric acid solution. These combinations being available in nature therefore offer the advantage that when they have been won, firing is not needed but only grinding to a suitable particle size. The materials in question in this case are basic and ultrabasic rocks and magnetite or magnetitite, the first two finely ground and the third coarsely ground. Rocks with a large content of magnetite are called by some magnetite (which is the name of the mineral) and by others magnetitite which is a rock name.

These basic rocks are commonly known as basalt, dolerite, gabbro and diabase; rocks in the ultrabasic rock group are picrite, peridotite, dunite, lherzolite. Picrite and peridotite often contain carbonate which must be removed by flotation and/or acid washing, otherwise there is bloating on the addition of the orthophosphoric acid solution. These are to be ground preferably wet, to a fineness corresponding to a C.P.S. of less than 15 microns in the case of the basic and ultrabasic rocks. In the case of rocks with a high proportion of magnetite the fineness required will depend upon the proportion present. For instance, in the case of a content of 75 percent or more of magnetite the fineness should be that corresponding to a C.P.S. of the order of 40 microns; for lesser amounts the fineness should be progressively increased to that for basic rocks.

The basic rocks are usually considered to be those containing a basic plagioclase feldspar (labradorite, bytownite or anorthite) with a member of the olivine group and/or a pyroxene or amphibole. Normally they contain a small proportion of magnetite. The only essential difference between the first three basic rocks is the size of the crystals. Basalt is finely crystalline and may contain some glassy material; it is a lava. Dolerite has a larger crystal size and is an intrusive rock which has cooled more slowly than basalt. Gabbro is a very coarsely crystalline rock that has cooled very slowly. Geologically basalt is known as a volcanic rock, dolerite as a hypabyssal rock and gabbro as a plutonic rock. Diabase has at times had various descriptions. The one adopted in this application is that it is a dolerite that has been altered in structure by natural forces. Its composition is that of a dolerite. This term is added because it is still used in mining circles and can cause confusion unless defined. Another loose term is "whinstone" which in this application is taken to be a dolerite.

The ultrabasic rocks are defined for this application as those containing a major proportion of olivine.

A great variety of other substances may be present in the natural combinations, such as those found in the natural rocks mentioned, which may contribute to the setting property or may be inert in this respect. Such combinations in the form of solid solutions thus offer practical means by which the degree and rate of setting can be moderated or controlled or even accelerated.

Thus magnetite by itself is very quick setting but its activity can be moderated by grinding with or mixing with an inert or feebly active material. An example is a mixture of Norwegian magnetite containing about 45 percent of true magnetite ground to a fineness of C.P.S. 21.6 microns, with ground quartz of C.P.S. 6.2 microns in the proportions of 1 part magnetite to 2 parts quartz (both by weight), giving an initial setting time of 50 minutes and good hardening compared with the undiluted magnetite which had a setting time of 8 minutes.

Other cements of the invention can be speeded up in setting time by adding a suitable proportion of natural or artificial magnetite in amount according to the setting time desired. As with all these cements the setting time is greatly influenced by the fineness. If finely ground, e.g., to a C.P.S. of 15 microns, useful cements can be made by including 20 percent and upwards of actual magnetite.

An example of the use of natural magnetite from Norway with basalt from Calton Hill, Derbyshire is given below:-

| | |
|---|---|
| Basalt C.P.S. 14.0 microns | 2 parts by weight |
| Magnetite (Norway) C.P.S. 21.6 microns | 1 part by weight |
| Setting time | 30 minutes |
| Basalt by itself, setting time | 55 minutes. |

Alternatively the basalt may be more finely ground e.g., a sample of the same basalt ground more finely had a setting time of 9 minutes.

Among the metasilicates enstatite ($MgO.SiO_2$) is comparatively inert but when combined with wollastonite ($CaO.SiO_2$) in equimolar proportions it gives the compound diopside ($CaO.MgO.2SiO_2$) which is very slow setting and hardening. The setting and hardening times of diopside can be speeded up by firing a composition yielding a small amount of wollastonite, e.g., 10 percent or less. 15 percent gives a very quick setting cement. A similar effect can also be obtained by increasing the lime content. $CaO.SiO_2$ by itself is "flash" setting.

Hedenbergite ($CaO.FeO.2SiO_2$) which also is slow setting, can be speeded up in the same way. Many cements of different setting and hardening times can be made by firing mixtures corresponding to various proportions of $MgO.SiO_2$, $CaO.SiO_2$ and $FeO.SiO_2$. In nature these solid solutions and mixed crystals are found in the more basic rocks such as diorites, dolerites and basalts under the general group names of pyroxenes and amphiboles.

In the foregoing description it has been noted that the setting time of $CaO.SiO_2$ could not be controlled by adding silica. This is because although it can form a solid solution the amount is too small to be of value as the material remains quick setting. However, as mentioned above the setting time can be controlled by combining a small amount of wollastonite with a large amount of diopside or hedenbergite.

In general the orthosilicates are more active than the metasilicates. The orthosilicates are:

| | |
|---|---|
| $2CaO.SiO_2$ | Glaserite, Larnite, Shannonite |
| $CaO.FeO.SiO_2$ | Iron monicellite |
| $2FeO.SiO_2$ | Fayalite |

| | |
|---|---|
| CaO . MgO . SiO$_2$ | Monticellite |
| 2MgO . SiO$_2$ | Forsterite |

These all belong to the orthorhombic system and can form solid solutions with one another. However, when 2CaO.SiO$_2$ is potentially present it actually combines with forsterite to form monticellite which can go into solid solution with the other orthosilicates. The order above is in descending activity as cements in terms of the invention. The first four members are very quick setting unless very coarsely ground and require to be moderated by combining with the less active forsterite in solid solution, e.g., forsterite combined with fayalite and/or monticellite.

These compounds form important constituents of basic rocks such as some of the dolerites, basalts, and gabbros, also the ultrabasic rocks under the general family name of olivine in which they occur as solid solutions.

The most interesting orthosilicate is forsterite which, though slow setting and hardening, gave a strength of 6200 p.s.i at one month for the standard 1-inch concrete cube test.

The feldspars referred to herein are known as the plagioclase feldspars. They belong to the triclinic system and are solid solutions of albite and anorthite.

Anorthite rarely occurs naturally in the pure state in the rocks in question but in solid solution with the soda feldspar albite (Na$_2$O.Al$_2$O$_3$.6SiO$_2$) with which it forms a continuous series of solid solution.

The recognised solid solutions have the following names:

| Name | percent Albite | percent Anorthite |
|---|---|---|
| Albite | 100 to 90 | 0 to 10 |
| Oligoclase | 90 to 70 | 10 to 30 |
| Andesine | 70 to 50 | 30 to 50 |
| Labradorite | 50 to 30 | 50 to 70 |
| Bytownite | 30 to 10 | 70 to 90 |
| Anorthite | 10 to 0 | 90 to 100 |

Albite is inert as a cement for the purpose of the invention and solid solutions with anorthite reduce the activity of anorthite. For instance, labradorite is substantially inert and so are oligoclase and andesine. Bytownite was prepared and found to make a useful cement and as the anorthite content was increased the setting time became shorter. The composition albite 30 percent/anorthite 70 percent was slow setting and required to be very finely ground. Albite contents greater than this do not make useful cements. Bytownite of the composition albite 20 percent/anorthite 80 percent gave a useful cement with an initial setting time of 25 minutes.

These feldspars may be made artificially and the setting time regulated by the presence of albite in solid solution but regulation by excess silica is preferred as more convenient as described above.

Labradorite and bytownite occur in basic and ultrabasic rocks but normally they behave as inert material where there is active material present which takes up nearly all the orthophosphoric acid before the feldspar has a chance to combine with it.

The basic and ultra-basic rocks that are suitable contain olivine but the activity of the olivine varies very much with its content of fayalite and 2CaO.SiO$_2$. Normally it is a solid solution of fayalite (2FeO.SiO$_2$) and forsterite (2MgO.SiO$_2$). The former is very active and the latter possesses a much lower degree of activity. If the fayalite content is low, in order to obtain quicker setting, it will be necessary to add a more active rock or a more active artificial material chosen from thoe described in this application e.g., those containing a high proportion of anorthite, monocalcium ferrite, magnetite or fayalite. An example is dunite from Mount Dun in New Zealand. This rock contains a high proportion of olivine but the concentration of fayalite in the olivine is not sufficient to give it an attractive rate or hardening. It therefore requires an addition of more active material. The sample examined had a fayalite/forsterite ratio of approximately 1 to 10.

Certain waste products of industry in the form of slags containing the required minerals may also be used as equivalents of the natural combinations either without modification or by dilution with less or more active materials already mentioned according as they are more or less active than desired. They may be wholly or partially in the form of glasses. Examples are copper slag from copper metallurgical processes, in which the active materials are magnetite, fayalite and glass, useful mixed with less active material or only coarsely ground; and blast furnace slag reacted with magnesia and silica.

In general the cements of the present invention may be ground in a dry state but they are preferably ground wet. The latter usually has the effect of increasing the setting time for a given rate of hardening. At the same C.P.S. the cement has a longer setting time for wet grinding than for dry grinding and it requires more orthophosphoric acid solution for a given consistency which leads to a greater ultimate strength. This behaviour is of great value in the practical use of the cement in constructional projects. If ground wet the product should be magneted to remove finely divided iron originating from the grinding media which causes bubbling on the addition of phosphoric acid. Magneting would not be necessary if ceramic grinding media, with possibly a non-metallic mill lining, are used, or the effect can be much reduced by using hard ferrous alloys. Magneting also removes some of any magnetite that may be present and which may have to be replaced as it is a strength-imparting component. In the case where magnetite is the major component wet grinding is contraindicated and dry grinding or ceramic grinding media with a non-metallic mill lining is advisable.

When the cement is wet-ground the resultant slurry would normally be dewatered but it may also be used wet if an allowance is made for the water present when adding the orthophosphoric acid solution.

As the water content is increased the shrinkage of these cements increases. The turning point between comparatively high and comparatively low shrinkage is at about 54 percent water; below 40 percent water the shrinkage is very low. For constructional purposes the cements would normally be used with an aggregate to give concrete. They may, however, also be used with little or no aggregate in combination with glass or silica fibre to form sheet material or members of other shapes with high tensile strength. In this event the lower water content solutions would be used, e.g., 40 percent or less, to minimise the shrinkage. Manufacture of sheet material would normally be carried out by spraying techniques; special shapes may be made by extrusion.

In an embodiment of the invention, material containing the combination of oxides in appropriately ground form is mixed with gravel and/or sand and then with the solution of orthophosphoric acid, or the material containing the oxides is mixed first with the acid and then added to the gravel and/or sand. the resulting mixture sets and hardens to a concrete or mortar suitable for constructional purposes. The pH of the setting and hardening products is always below 7. Steel reinforcement, when used, should be pretreated with orthophosphoric acid before application of the concrete to form a protective layer of the very resistant ferrous phosphate. If this is not done the steel becomes phosphated in situ with liberation of hydrogen which weakens its adhesion to the concrete. It is obvious that carbonates must be absent from the aggregates used.

The concretes made with the cement of the present invention are resistant to any sulphate in any concentration, are compatible with glass and silica fibre, and are resistant to sugar solutions and to many dilute organic acids. In powder form, the cements of the invention do not deteriorate in humid atmospheres as do Portland and high alumina cement powders.

EXAMPLES

The following Examples are given for the purpose of illustrating the invention without limiting it thereto. The percentages expressed are by weight.

In the examples given the initial setting time is the time available for mixing the concrete and placing it before it begins to stiffen.

The tests on concrete were made with a 1-inch concrete cube test designed to give the same result as the 4-inch concrete cube test described in British Standard B.S.12 "Portland Cement". The advantage of this test is that a smaller amount of material is required, less storage space is needed and results with aggressive agents (e.g., sulphates, acids, sugars) are obtained far more quickly. The test was developed by the Research Department, The Associated Portland Cement Manufacturers Limited.

EXAMPLE 1

Raw materials: Tertiary London Clay from Ockenden, in Essex, aluminium oxide, calcium carbonate, sintered at 1150° C.

| Analysis of cement: | percent |
|---|---|
| $SiO_2$ | 45.2 |
| $Al_2O_3$ | 30.1 |
| $Fe_2O_3$ | 6.3 |
| $CaO$ | 12.8 |
| $MgO$ | 2.4 |
| $K_2O + Na_2O$ | 3.1 |
| Rest | 0.1 |
| | 100.0 |

Characteristic particle size is 10.2 microns. Compressive strength at one month was 7850 p.s.i. for 1-inch concrete cubes. The phosphoric acid solution used was as defined in the foregoing description. Initial setting time = 30 minutes.

The presence of iron oxide increases the strength considerably as can be seen by comparing this cement with Example 2 which contains very little iron oxide.

There is 32.7 percent of inert material the analysis of which is:

| | percent | percent based on the cement |
|---|---|---|
| $SiO_2$ | 51.7 | 16.9 |
| $Al_2O_3$ | 35.2 | 11.5 |
| $Fe_2O_3$ | 6.0 | 2.0 |
| $CaO$ | 1.6 | 0.5 |
| $K_2O$ | 5.5 | 1.8 |
| | 100.0 | 32.7 |

In the next table the figures from the second column of percentages have been subtracted from the foregoing analysis of the cement, to give the difference (1) which is then recalculated to a basis of 100 percent (2).

| | (1) percent | (2) percent |
|---|---|---|
| $SiO_2$ | 28.3 | 42.1 |
| $Al_2O_3$ | 18.6 | 27.6 |
| $Fe_2O_3$ | 4.3 | 6.4 |
| $MgO$ | 2.4 | 3.6 |
| $CaO$ | 12.3 | 18.3 |
| $K_2O$ | 1.3 | 1.9 |
| Rest | 0.1 | 0.1 |
| | | 100.0 |

Expressing these percentages in terms of the cement composition the following is obtained:

| | percent |
|---|---|
| $CaO . Al_2O_3 . 2SiO_2$ (anorthite) | 50.6 |
| $2MgO . SiO_2$ | 4.2 |
| $CaO . SiO_2$ | 1.3 |
| $CaO . Fe_2O_3$ | 5.8 |
| Excess silica | 4.0 |
| Alkali | 1.3 |
| Inert material | 32.7 |
| Rest | 0.1 |
| | 100.0 |

EXAMPLE 2

Raw materials: China clay, calcium carbonate, Sintered at 1350° C.

| | percent |
|---|---|
| $SiO_2$ | 47.5 |
| $Al_2O_3$ | 38.3 |
| $Fe_2O_3$ | 0.7 |
| $CaO$ | 12.7 |
| Rest | 0.8 |
| | 100.0 |

The characteristic particle size is 6.1 microns. Compressive strength at one month was 6750 p.s.i. for the 1-inch concrete cube test. The phosphoric acid solution used was as defined in the foregoing description. The initial setting time was 20 minutes.

Treating the figures as for Example 1 the following was obtained: The inert material was 40.2 percent of the cement.

| | percent | percent based on the cement |
|---|---|---|
| $SiO_2$ | 52.0 | 20.9 |
| $Al_2O_3$ | 41.8 | 16.8 |
| $Fe_2O_3$ | 1.7 | 0.7 |
| $CaO$ | 2.5 | 1.0 |
| Rest | 2.0 | 0.8 |
| | 100.0 | 40.2 |

In the next table the figures from the second column of percentages have been subtracted from the foregoing analysis of the cement, to give the difference (1) which is then recalculated to a basis of 100 percent (2).

|  | (1) percent | (2) percent |
|---|---|---|
| $SiO_2$ | 26.6 | 44.5 |
| $Al_2O_3$ | 21.5 | 36.0 |
| $Fe_2O_3$ | 0.0 | 0.0 |
| CaO | 11.7 | 19.5 |
| Rest | 0.0 | 0.0 |
|  |  | 100.0 |

The composition in column (2) is close to that of anorthite. The anorthite content of the cement itself is 59.1 percent.

EXAMPLE 3

This cement was made by grinding an ordinary London Brick Co. Rustic Fletton brick to a C.P.S. of 11.8 microns. These bricks are made by firing Oxford clay to about 1100° C. The strength at three weeks was 4850 p.s.i. for the 1-inch concrete cube test. The phosphoric acid solution used was as defined in the foregoing description. The initial setting time was 47 minutes. The analysis of the cement was:

|  | percent |
|---|---|
| $SiO_2$ | 51.3 |
| $Al_2O_3$ | 21.4 |
| $Fe_2O_3$ | 6.3 |
| CaO | 10.2 |
| Rest | 10.8 |
|  | 100.0 |

(The Rest consisted of MgO, $K_2O$, $Na_2O$, $SO_3$ and loss on ignition.)

In the cement itself there is theoretically 6.8 percent monocalcium ferrite and about 45 percent anorthite. However, due to the irregular character of the material of the brick these figures should be taken as approximate. The figures correspond to those for material that has been properly homogenised before firing.

Fletton bricks usually contain enough lime to behave as a cement when used with orthophosphoric acid. Some stock bricks also behave in a similar manner since they also contain lime.

EXAMPLE 4

This Example represents an extreme case in which there is no anorthite but monocalcium ferrite with a little ferrous oxide. It represents the opposite condition to Example 2 which contains practically no monocalcium ferrite. The inert soluble and insoluble material consists of excess ferric oxide, alumina and calcium fluoride.

A mix of 50 percent ferric oxide, 20 percent calcium fluoride, 20 percent calcium carbonate and 10 percent aluminium oxide was fired at 1150° C. Ground to a C.P.S. of 7.6 microns and used with the phosphoric acid solution it gave a strength in the 1-inch concrete cube test of 4750 p.s.i. at 44 days.

The monocalcium ferrite content was 43 percent. The calcium fluoride was required in this mix because monocalcium ferrite is difficult to prepare in the absence of a flux.

EXAMPLE 5

A cement was made from a whinstone (dolerite) from Ratho near Edinburgh, by grinding wet followed by magneting to remove the metallic iron. Magneting also removed some of the magnetite present. Analysis of cement:

|  | percent |
|---|---|
| $SiO_2$ | 49.04 |
| $Al_2O_3$ | 17.29 |
| $Fe_2O_3$ | 2.74 |
| FeO | 8.71 |
| CaO | 4.20 |
| MgO | 7.37 |
| $K_2O$ | 1.70 |
| $Na_2O$ | 3.64 |
| Loss on ignition | 5.22 |
| Rest | 0.09 |
|  | 100.00 |

| Mineralogical recast: | percent |
|---|---|
| Anorthite | 20.8 |
| Albite | 30.8 |
| Orthoclase | 9.9 |
| Forsterite | 3.7 |
| Enstatite | 13.1 |
| Fayalite | 10.6 |
| Magnetite | 4.0 |
| Loss on ignition | 5.2 |
| Undetermined | 1.9 |
|  | 100.0 |

The main active materials are bytownite, olivine and magnetite totalling approximately 44 percent. Microscopical examination showed that there is a significant amount of bytownite present which contributes to the strength. This bytownite has the approximate composition anorthite 80 percent, albite 20 percent and its approximate amount is 26 percent.

The rock had been ground to a C.P.S. of 11.1 microns. Using the phosphoric acid solution the setting time was 1½-hours. One-inch concrete cubes were made with the same solution and gave an average strength at one month of 5180 p.s.i.

EXAMPLE 6

A cement was made from basalt from Calton Hill in Derbyshire by grinding to a C.P.S. of 13.4 microns. The setting time with the phosphoric acid solution was 9 minutes.

| Analysis of cement: | percent |
|---|---|
| $SiO_2$ | 44.53 |
| $Al_2O_3$ | 16.64 |
| $Fe_2O_3$ | 4.28 |
| FeO | 8.32 |
| CaO | 9.08 |
| MgO | 10.66 |
| $K_2O$ | 0.90 |
| $Na_2O$ | 2.33 |
| Loss on ignition | 3.26 |
|  | 100.00 |

| Mineralogical recast: | percent |
|---|---|
| Anorthite | 32.3 |
| Albite | 19.7 |
| Orthoclase | 5.2 |
| Fayalite | 9.1 |
| Forsterite | 11.4 |
| Monticellite | 7.2 |
| Enstatite | 5.6 |
| Magnetite | 6.2 |
| Loss on ignition | 3.3 |

-continued

| 100.0 |

The main active materials are olivine and magnetite amounting to 33.9 percent. Microscopical examination showed that the plagioclase feldspar is labradorite which is substantially inert.

One-inch concrete cubes were made with the phosphoric acid solution and gave an average strength of 1715 p.s.i. at 3-days and 4000 p.s.i. at 28-days.

Concretes made with cements of this invention are completely resistant to all sulphates in all concentrations.

Except in the case of acetic acid they have, when manufactured and used according to the methods described, a high resistance only to dilute solutions of organic and mineral acids, e.g., of pH down to about 2.5. The cements are completely resistant to acetic acid which actually increases the strength. They are not resistant to lactic acid or caustic soda.

Silicate cements having chemical compositions related to some of the cements of the present invention and containing phosphate, are known for dental purposes, see for instance
1. The Science of Dental Materials by E. W. Skinner and R. W. Phillips, published in a sixth edition by W. B. Saunders Company of Philadelphia, U.S.A. and London, U.K., in 1967; and
2. Dental Silicate Cements by A. D. Wilson (U.K.) published as a National Bureau of Standards Special Publication 354 and part of the Proceedings of the 50th Symposium on Dental Materials held October 608 1969 at Gaithersburg, Md (U.S.A.) issued June 1972.

The Skinner and Phillips book gives the most comprehensive account of the dental silicate cements. All of them are very complex glasses and are made from highly purified raw materials which, unlike the cements of the present invention, are heated to the molten state and quenched in water and then ground finely. Being glasses they contain no anorthite or crystalline material.

In the Bureau of Standards publication the method of manufacture of such dental cements is described: "The powders are unique amongst cements in that they are ground glassy bodies and not crystalline clinkers, a physical state which may account for the translucent nature of the final cement. The dental silicate glass is prepared by fusing a silica and alumina mixture in a fluoride flux containing minor amounts of phosphate. The fluoride flux is based on cryolite; the addition of fluoride lowers its fusion point".

The cements of the present invention accordingly differ from such dental cements not only by virtue of their quite different nature, scale and purpose, but also in that they contain anorthite or other crystalline compounds and are not glassy.

Method of Determining Inert Matter

Weigh out accurately about 1 g. of cement into a 4-inch platinum basin. Add 20 ml. concentrated hydrochloric acid, cover with a clock glass and place on a steam bath for three-quarters of an hour, stirring now and again. Then add 1- ml. of concentrated hydrochloric acid and continue heating and stirring for a quarter of an hour. Then dilute somewhat with hot water, add some ashless filter aid and stir to disperse it. Take the basin off the steam bath and filter the contents on a 12.5 cm. No. 40 Whatman filter paper. Wash out the basin into the filter. Wash the residue three times with hot water. Then wash the residue into a 250 ml. tall form beaker paying attention to the residue caught in the folds of the filter paper. Reserve the filter paper.

Make up the contents of the beaker to 100 ml. and place in a boiling water bath until at 100° C. Add 6 g. anhydrous sodium carbonate and stir frequently for 15 minutes. Add some ashless filter aid and filter on reserved filter. Wash three times with hot water, three times with hot 1-in-20 hydrochloric acid and then five times with hot water. Dry the filter nearly but not quite to dryness and ignite in a crucible at about 900° C to constant weight. Determine the weight of the ignited residue and express it as a percentage of the cement.

Analyse the residue for $SiO_2$, $Al_2O_3$, $Fe_2O_3$ and $CaO$ by any suitable method well-known to competent analytical chemists.

This residue represents the inert material which plays no useful part in the setting and hardening process.

The water to be used in this test must be either distilled or de-ionized water. The chemicals used are to be of analytical reagent quality. Porcelain basins and crucibles may be used but platinum is preferred.

What is claimed is:
1. A method of making a constructional cement which comprises (a) artificially preparing a particulate chemical combination of oxides selected from the group consisting of anorthite with excess silica in solid solution in the anorthite wherein the excess silica is present in amount of at least 5% by weight, and anorthite with albite in solid solution in the anorthite wherein the albite is present in amount not greater than 30% by weight, by sintering an intimate mixture of minerals which severally contribute the constitutent oxides of the combination or of compounds which form said oxides under sintering conditions, in stoichiometric proportions to form said combination, whereby said oxides combine, and grinding the sintered product; and (b) reacting said ground product with an amount sufficient to bring about hardening thereof, of an aqueous solution containing 35 to 60% by weight of orthophosphoric acid.

2. A method according to claim 1, wherein said aqueous solution contains an amount of zinc orthophosphate not exceeding 15 percent by weight based on the solution.

3. A method according to claim 1, wherein said aqueous solution contains an amount of aluminium orthophosphate not exceeding 20 percent by weight based on the solution.

4. A method of making a cement composition according to claim 1, which further comprises incorporating glass or silica fibre reinforcement.

5. A method according to claim 4, which further comprises incorporating in the cement composition a fibrous material reinforcement.

6. A method according to claim 1, wherein said particulate combination comprises anorthite and a solid solution of silica therein.

7. A method according to claim 1 wherein said product further includes monocalcium ferrite.

8. A method according to claim 1 wherein said product further includes iron oxide.

9. A method of making a constructional cement, which comprises the steps of:
a. sintering an intimate mixture of compounds which forms anorthite and a sufficient amount of a compound selected from the group consisting of silica in amount of at least 5% by weight and albite in amount not greater than 30% by weight in solid solution in said anorthite as to retard setting of the recovered product;

b. grinding the product of step (a) to recover constructional cement having retarded setting time; and c. mixing the ground product with an amount of an aqueous solution containing 35–60% by weight orthophosphoric acid sufficient to cause the product to solidify as a hard, set constructional cement mass.

* * * * *